United States Patent Office 3,304,270
Patented Feb. 14, 1967

3,304,270
POLYMERS OF HEXAHYDRODIAZAPHOSPHO-
RINES OR DIAZAPHOSPHOLIDINES AND
SILANES
Richard T. Dickerson, Midland, Mich., assignor to The
Dow Chemical Company, Midland, Mich., a corporation of Delaware
No Drawing. Filed Sept. 21, 1964, Ser. No. 398,083
19 Claims. (Cl. 260—2)

This invention relates to new polymers and a process for preparation thereof. More specifically it relates to a polymer having a heterocyclic ring, partially inorganic, in the linear chain thereof. More specifically, this invention relates to polymers having hexahydrodiazaphosphorine or diazaphospholidine cyclic rings in the linear chain thereof. For simplicity such rings are hereinafter sometimes referred to as "diazaphosphorus rings."

The polymer products of this invention are capable of being formed into fibers and films and being used for various purposes appropriate for such shaped articles, such as textiles, clothing, protective coatings, etc.

The polymers of this invention are prepared by the reaction of the heterocyclic compound or "diazaphosphorus ring compounds" of the formula

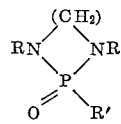

or more commonly

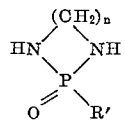

wherein $n$ is 2 or 3; R is hydrogen or an alkali metal such as Na, K or Li; R' is NR"$_2$, OR" or R" group, and R" is an aliphatic, cycloaliphatic or aromatic hydrocarbon group having no more than 20, preferably no more than 6 carbon atoms. These compounds and the preparation thereof are disclosed in applicant's copending application Serial No. 398,069 filed the same date herewith.

To form the polymers of this invention, the heterocyclic compounds are condensed by reaction with one or more "condensing" reagents of the formula: SiX$_4$, wherein X is a halogen atom, e.g. Cl, Br, I or F, or an R" or OR" radical in which R" is as defined above and the reagent contains at least two halogen atoms.

The new polymers of this invention are represented by the formula

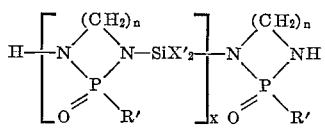

wherein $n$ and R' are as defined above, $x$ is an integer of at least 1, preferably at least 3, and X' is X or a diazaphosphorus ring as defined herein attached to the Si through one of the ring nitrogen atoms.

Preferably X' represents X. However, since the SiX$_4$ reagent is tetrafunctional more than two of the X groups can be replaced by the diazaphosphorus radical

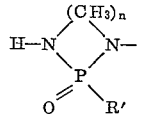

Where only two X groups are replaced by the heterocyclic compounds the resultant polymers are linear. Where more than two X groups are so replaced, the resultant polymers are branched or crosslinked between linear chains by such diazaphosphorus rings.

Typical "condensing" reagents of the formula given above are silicon halide, hydrocarbon and oxyhydrocarbon derivatives, such as SiCl$_4$, SiBr$_4$, SiI$_4$, Si(CH$_3$)$_2$Cl$_2$, Si(C$_2$H$_5$)$_2$Cl$_2$, Si(C$_5$H$_{11}$)$_2$Cl$_2$, SiBr$_2$(C$_2$H$_5$)$_2$, SiCl$_3$CH$_3$, Si(C$_6$H$_5$)$_2$Cl$_2$, Si(C$_6$H$_{11}$)$_2$Cl$_2$, Si(OCH$_3$)$_2$Br$_2$, Si(OC$_4$H$_9$)$_2$Br$_2$, Si(OC$_6$H$_5$)$_2$Br$_2$, Si(OC$_{10}$H$_7$)$_2$Cl$_2$, Si(OC$_6$H$_{11}$)$_2$Cl$_2$, Si(OCH$_3$)$_2$Cl$_2$, Si(OC$_4$H$_9$)$_2$Cl$_2$, Si(OC$_6$H$_5$)$_2$Br$_2$, Si(OC$_{10}$H$_7$)$_2$Br$_2$, Si(OC$_6$H$_{11}$)$_2$Br$_2$, Si(OCH$_3$)$_2$F$_2$, Si(OC$_4$H$_9$)$_2$F$_2$, Si(CH$_3$)$_2$F$_2$, SiCH$_3$F$_3$, Si(CH$_3$)$_2$I$_2$, SiCH$_3$I$_3$, etc.

Typical hydrocarbon groups that can be used for R' and R" include: methyl, ethyl, propyl, butyl, amyl, hexyl, octyl, decyl, octadecyl, dodecyl, vinyl, allyl, butenyl, butadienyl, cyclohexyl, propargyl, cyclopentyl, cyclohexenyl, cyclopentadienyl, methyl cyclohexyl, ethyl cyclohexyl, methyl cyclopentyl, pentyl, tolyl, xylyl, ethyl phenyl, propyl phenyl, butyl phenyl, naphthyl, methyl naphthyl, ethyl naphthyl, octyl naphthyl, diphenyl, methyl diphenyl, ethyl diphenyl, etc.

Typical oxhydrocarbon radicals than can be used for R' include: methoxy, ethoxy, butoxy, hexoxy, octoxy, vinyloxy, allyloxy, butenyloxy, butadienyloxy, propargyloxy, cyclohexyloxy, cyclopentoxy, methyl cyclohexoxy, methyl cyclopentoxy, phenoxy, tolyloxy, xylyloxy, naphthoxy, methylnaphthoxy, diphenyloxy, etc.

A typical heterocyclic starting material used in preparing the polymers of this invention is 2-diphenylamino-1,3,2-diazapholidine-2-oxide which has the formula

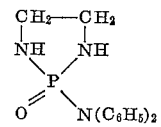

Another typical starting compound is 2-diphenylamino-hexahydro-1,3,2-diazaphosphorine-2-oxide which has the formula

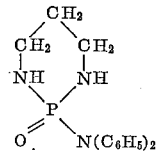

Other typical starting compounds are disclosed hereinafter. These cyclic compounds can be used as such or in the form of the alkali metal derivatives in which one or both of the hydrogens attached to the ring nitrogen atoms have been replaced by Na, K or Li.

As previously indicated, various diazaphospholidine-oxides and hexahydro-1,3,2-diazaphosphorine-oxides suitable for use in the practice of this invention and methods of preparation are disclosed in applicant's copending application Serial No. 398,069, filed the same date herewith. However, the methods of preparation are illustrated by the following examples which are typical for the various related compounds.

EXAMPLE I

A solution of 48 parts ethylene diamine in 500 parts of methylene chloride is prepared by stirring a mixture thereof. The solution is cooled to 5° C. in an ice bath and then to this is added dropwise a filtered solution of 22 parts diphenyl-phosphoramidic dichloride in 300 parts of methylene chloride over a period of about 4 hours. The mixture is then permitted to stand overnight. From this the precipitated solids are filtered, and the filtrate is evaporated to recover the solute. There is thus obtained a product which when recrystallized from 2-propanol gives a recovery of 25 parts having a melting point of 180–

182° C. The precipitated solids recovered by the filtering operation are extracted with water to remove amine salt, and then dried. This residue amounts to 57 parts and has a melting point of approximately 177° C. This product is insoluble in methylene chloride in its recovered form. However, upon being dissolved in methanol and then recovered by evaporation of the methanol, the recovered solid is soluble in methylene chloride and is identical to the solute recovered from the evaporated filtrate. The apparent difference in methylene chloride solubility of the crude material is believed to be due to a difference in crystalline form as compared with the same compound recovered from the methylene chloride solution. This product is identified as 2-diphenylamino-1,3,2-diazaphospholidine-2-oxide and is the compound used in a number of examples hereinafter for preparation of polymeric materials.

EXAMPLE II

The procedure of the preceding example is repeated except that an equivalent amount of 1,3-propane diamine is used in place of the ethylene diamine. The 2-diphenylamino-hexahydro-1,3,2-diazaphosphorine oxide product has a melting point of 169–170° C. When the procedure is repeated using phosphoryl dihalides (R'POCl$_2$) with different R' groups respectively, the corresponding products are obtained such as for example:

2-phenyl-hexahydro-1,3,2-diazaphosphorine oxide having a melting point of 138–141° C.;

2-dimethylamino-hexahydro - 1,3,2 - diazaphosphorine oxide having a melting point of 127–130° C.;

2-methyl-hexahydro-1,3,2-diazaphosphorine oxide having a melting point of 116–121° C.

EXAMPLE III

With the reaction temperature maintained at 15° C., a solution of 105 parts of phenyl phosphorodichloridate in 200 parts of chloroform is added with stirring to a solution of 82 parts 1,3-propanediamine in 600 parts of chloroform. The resultant solution is allowed to stand at room temperature overnight. After precipitated solids are removed by filtration, the product is recovered from the filtrate by evaporation of the solvent. A crude yield of 33 parts is thus obtained. Upon recrystallization from ethyl acetate, the product is found to melt at 145.5° C. and is identified as hexahydro-2-phenoxy-1,3,2-diazaphosphorine-2-oxide. Additional product is recovered from the original filter cake by extraction with ethyl acetate.

By using an equivalent amount of methyl phosphorodichloridate in place of the phenyl compound used above, the hexahydro-2-methoxy-1,3,2-diazaphosphorine-2-oxide is obtained having a melting point of 86–89° C. after crystallization from toluene.

The above procedures can be used in preparing all the various diazaphosphorus cyclic ring compounds for use in the practice of this invention by using phosphoryl dihalides in which the diphenylamino radical of the phosphoryl dihalide used in Examples I and II is replaced by various —NR"$_2$, —NHR", OR" and R" radicals as defined and illustrated above for the R' radical.

By these procedures, the following typical compounds are prepared:

2-dimethylamino-hexahydro-1,3,2-diazaphosphorine-2-oxide
2-dicyclohexylamino-hexahydro-1,3,2-diazaphosphorine-2-oxide
2-dibenzylamino-hexahydro-1,3,2-diazaphosphorine-2-oxide
2-ethyl-hexahydro-1,3,2-diazaphosphorine-2-oxide
2-amyl-hexahydro-1,3,2-diazaphosphorine-2-oxide
2-phenyl-hexahydro-1,3,2-diazaphosphorine-2-oxide
2-cyclopentyl-hexahydro-1,3,2-diazaphosphorine-2-oxide
2-naphthyl-hexahydro-1,3,2-diazaphosphorine-2-oxide
2-methyl-hexahydro-1,3,2-diazaphosphorine-2-oxide
2-cyclohexyl-hexahydro-1,3,2-diazaphosphorine-2-oxide
2-tolyl-hexahydro-1,3,2-diazaphosphorine-2-oxide
2-butyl-hexahydro-1,3,2-diazaphosphorine-2-oxide
2-octyl-hexahydro-1,3,2-diazaphosphorine-2-oxide
2-allyl-hexahydro-1,3,2-diazaphosphorine-2-oxide
2-(p-allylphenyl)-hexahydro-1,3,2-diazaphosphorine-2-oxide
2-cyclopentadienyl-hexahydro-1,3,2-diazaphosphorine-2-oxide
2-butadienyl-hexahydro-1,3,2-diazaphosphorine-2-oxide
2-propargyl-hexahydro-1,3,2-diazaphosphorine-2-oxide
2-cyclohexenyl-hexahydro-1,3,2-diazaphosphorine-2-oxide
2-methoxy-hexahydro-1,3,2-diazaphosphorine-2-oxide
2-phenoxy-hexahydro-1,3,2-diazaphosphorine-2-oxide
2-cyclohexoxy-hexahydro-1,3,2-diazaphosphorine-2-oxide
2-butoxy-hexahydro-1,3,2-diazaphosphorine-2-oxide
2-allyloxy-hexahydro-1,3,2-diazaphosphorine-2-oxide
2-tolyloxy-hexahydro-1,3,2-diazaphosphorine-2-oxide
2-dimethylamino-1,3,2-diazaphospholidine-2-oxide
2-dicyclohexylamino-1,3,2-diazaphospholidine-2-oxide
2-dibenzylamino-1,3,2-diazaphospholidine-2-oxide
2-ethyl-1,3,2-diazaphospholidine-2-oxide
2-amyl-1,3,2-diazaphospholidine-2-oxide
2-phenyl-1,3,2-diazaphospholidine-2-oxide
2-cyclopentyl-1,3,2-diazaphospholidine-2-oxide
2-naphthyl-1,3,2-diazaphospholidine-2-oxide
2-methyl-1,3,2-diazaphospholidine-2-oxide
2-cyclohexyl-1,3,2-diazaphospholidine-2-oxide
2-tolyl-1,3,2-diazaphospholidine-2-oxide
2-butyl-1,3,2-diazaphospholidine-2-oxide
2-octyl-1,3,2-diazaphospholidine-2-oxide
2-allyl-1,3,2-diazaphospholidine-2-oxide
2-(p-allylphenyl)-1,3,2-diazaphospholidine-2-oxide
2-cyclopentadienyl-1,3,2-diazaphospholidine-2-oxide
2-butadienyl-1,3,2-diazaphospholidine-2-oxide
2-propargyl-1,3,2-diazaphospholidine-2-oxide
2-cyclohexenyl-1,3,2-diazaphospholidine-2-oxide
2-methoxy-1,3,2-diazaphospholidine-2-oxide
2-phenoxy-1,3,2-diazaphospholidine-2-oxide
2-cyclohexoxy-1,3,2-diazaphospholidine-2-oxide
2-butoxy-1,3,2-diazaphospholidine-2-oxide
2-allyloxy-1,3,2-diazaphospholidine-2-oxide
2-tolyloxy-1,3,2-diazaphospholidine-2-oxide In reacting the heterocyclic compound with the various linking agents, the reaction is favored by the use of a hydrogen halide acceptor or scavenger when hydrogen halide is condensed out of the reaction. However, when the alkali metal salts of the heterocyclic compounds are used, halogen is removed as the alkali metal halide.

The invention is best illustrated by the following examples. These examples are intended merely for illustrative purposes and are not intended to restrict in any way the scope of the invention nor the manner in which the invention can be practiced. Unless specifically indicated otherwise, here and throughout the specification, parts and percentages are given by weight.

EXAMPLE IV

A solution of 2.7 parts 2-diphenylamino-1,3,2-diazaphospholidine-2-oxide and 2 parts triethyl amine is prepared in 25 parts of chloroform. To this solution is added dropwise with stirring 1.3 parts dichlorodimethylsilane. After the addition is completed, the solution is permitted to stand overnight during which time the color darkens. The product is then extracted with an equal volume of water, the water layer separated and the chloroform layer evaporated. From the chloroform layer is obtained about 3 parts of a clear, amber resinous product which can be drawn into fibers and cast in a film from chloroform solution. The infra-red spectrum of this film shows reduction in intensity of the N–H band at 3μ and appearance of bands at about 10μ which are in the region where Si–N absorption should occur.

These data agree with formation of the described polymer which is believed to proceed as follows:

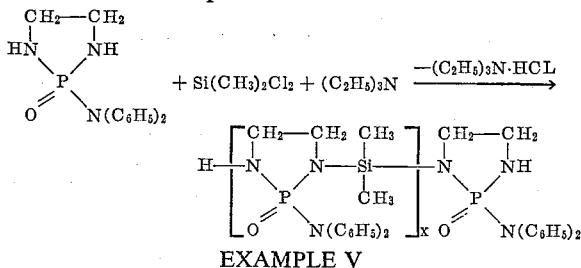

EXAMPLE V

The procedure of Example IV is repeated except that in place of the diazaphospholidine there is used 2.8 parts of 2-diphenylamino-hexahydro-1,3,2-diazaphosphorine-2-oxide. The infra-red spectra of the product shows similar effects and is consistent with the formation of the following polymer:

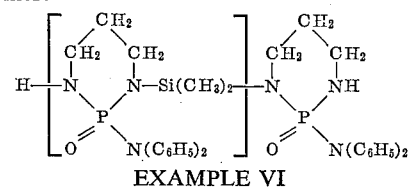

EXAMPLE VI

The monolithium salt of 2-diphenylamino-1,3,2-diazaphospholidine-2-oxide is prepared using 2.78 parts of the oxide and 1.21 parts of butyl lithium in sodium-dried benzene. To this is added a solution of 0.95 parts of silicon tetrachloride in 100 parts of hexane. The reaction is vigorous and results in the precipitation of a dark brown and soluble solid which is indicated to be the dimer, formed by the following reaction:

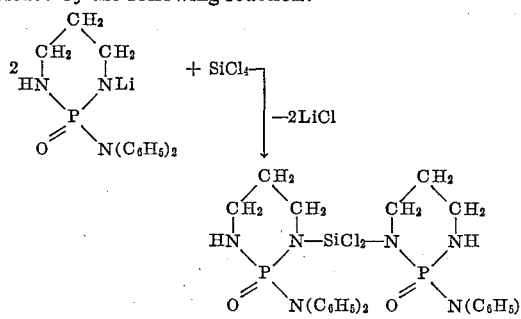

This dimer is further polymerized by the addition of a hydrogen chloride acceptor (triethylamine) and additional $SiCl_4$ to give a polymer of the formula:

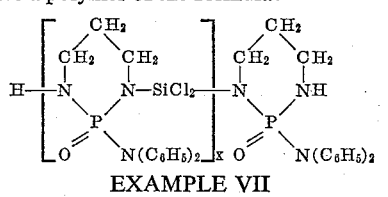

EXAMPLE VII

The dimer and higher polymer of Example VI are prepared by repeating the procedure of Example VI using the corresponding monosodium salt prepared by reaction of the heterocyclic base with $NaNH_2$ in an inert solvent such as benzene.

EXAMPLE VIII

The dimer and higher polymer of Example VI are prepared by repeating the procedure of Example VI with the corresponding monopotassium salt of the heterocyclic base prepared with $KNH_2$ in an inert solvent such as benzene.

EXAMPLE IX

The procedures of Examples IV–VIII are repeated using in place of the diazaphosphorus compound of the respective examples the corresponding compounds in which the diphenylamino group is replaced by the following groups:

—$N(CH_3)_2$
—$N(C_2H_5)_2$
—$N(C_6H_{13})_2$
—$N(C_6H_{11})_2$
—$N(C_5H_5)_2$
—$N(C_{10}H_7)_2$
—$C_6H_5$
—$CH_3$
—$C_4H_9$
—$C_6H_{11}$
—$OCH_2CH_3$
—$OC_6H_4CH_3$
—$OC_6H_{11}$

In each case the resultant polymer corresponds in the polymeric structure to that shown in the respective examples except that the repeating units of the polymer and in the diazaphosphorus end group has the diphenylamino group replaced by the respective R' groups recited above.

For example, the following typical specific polymers are obtained:

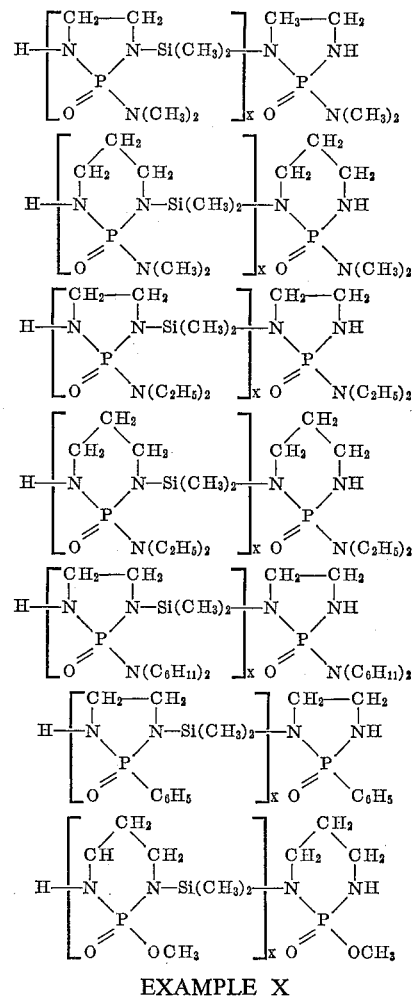

EXAMPLE X

The procedures of the preceding Examples IV–VIII are repeated using in each case a diazaphosphorus compound in which the diphenylamino group has been replaced by methyl, butyl, octyl, allyl, cyclohexyl, phenyl, naphthyl, ethoxy, hexoxy, cyclohexyloxy, phenoxy and allyloxy radicals, respectively. In each case, the structure of the resultant polymer corresponds to that of the respective examples except that the diphenylamino radical is replaced in the repeating unit and in the terminal diazaphosphorus radical by the respective radicals listed above.

EXAMPLE XI

The procedure of Example IV is repeated using the following coupling agents in equivalent amounts in place of the dichlorodimethyl silane:

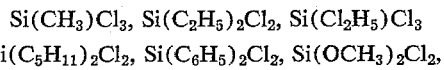

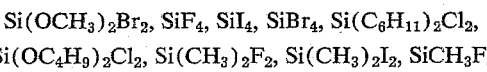

$$Si(OCH_3)_2Br_2, SiF_4, SiI_4, SiBr_4, Si(C_6H_{11})_2Cl_2,$$

$$Si(OC_4H_9)_2Cl_2, Si(CH_3)_2F_2, Si(CH_3)_2I_2, SiCH_3F_3$$

and $Si(CH_3)_2Br_2$, respectively. In each case, the resultant polymer has a connecting link between the diazaphosphorus rings corresponding to the respective coupling agents substituted for the dichlorodimethyl silane.

While the polymeric structures defined above are represented as linear polymers, the polymers can actually be crosslinked in view of the trifunctional or tetrafunctional character of some of the coupling agents. The freedom or presence of crosslinking in the respective polymers and the degree of such crosslinking can be controlled by various means. For example, the proportions of diazaphosphorus compound can be restricted so that there is only sufficient to react with only two valences of the coupling agent, preferably with the diazaphosphorus compound being added to the coupling agent. Also, the substituent groups on the coupling agent can be of different degrees of reactivity so that the reaction is preferentially with the more reactive or more easily displaced substituent groups. Such is the case with dichlorodimethyl silane and dichlorodiethyl silane.

The reactivity of the respective reagents described herein is sufficient to cause the desired reaction without any particular conditions being required to promote the reaction. Generally, however, the reaction is favored by a temperature of at least room temperature and no unfavorable results are occasioned by having the temperature as high as 100° C. except that provisions should be made for absorption of heat where the reaction is exceedingly exothermic. Except as described above with respect to hydrogen halide acceptors, no particular catalysts or initiators are required to promote the reaction. In most cases, in view of the reactivity of the respective coupling agents, it is desirable to have the reagents and reaction mixture in an anhydrous condition. Generally, atmospheric pressure is suitable, although no disadvantage is seen in the application of superatmospheric pressures.

A previously indicated, the polymers of this invention include dimers, namely, those having two of the diazaphosphorus ring structures therein up to molecular weights of 50,000 and even higher, depending on the particular properties desired in the resultant polymers. Solvents suitable for use in conducting the reactions will vary according to the particular reagents being used. In many cases, the polymer products are soluble in the solvent used for the reagents. However, this depends on the amount of crosslinking and the nature of the polymer. Solvents suitable for many of the reactions include: methylene chloride, chloroform, ethylene chloride, trichloroethane, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A polymer consisting essentially of a structure having the formula

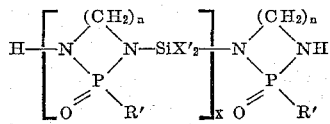

wherein

R' is a radical selected from the class consisting of NR''$_2$, OR'' and R'';

R'' is a hydrocarbon radical having no more than 20 carbon atoms therein selected from the class consisting of aliphatic, aromatic and cycloaliphatic hydrocarbon;

$n$ is an integer having a value no less than 2 and no more than 3; $x$ is an integer of at least 1; and X' is a radical selected from the class consisting of halogen, OR'', R'' and

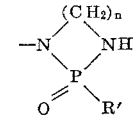

2. A polymer consisting essentially of a structure having the formula

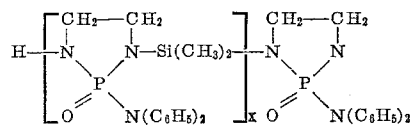

wherein $x$ is an integer of at least 1.

3. A polymer consisting essentially of a structure having the formula

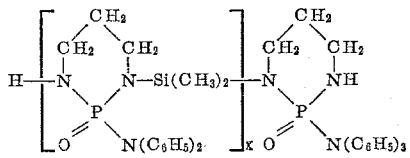

wherein $x$ is an integer of at least 1.

4. A polymer consisting essentially of a structure having the formula

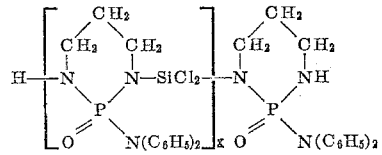

wherein $x$ is an integer of at least 1.

5. A polymer consisting essentially of a structure having the formula

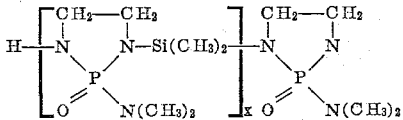

wherein $x$ is an integer of at least 1.

6. A polymer consisting essentially of a structure having the formula

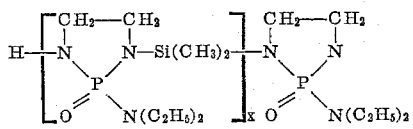

wherein $x$ is an integer of at least 1.

7. A polymer consisting essentially of a structure having the formula

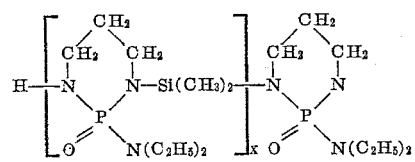

wherein $x$ is an integer of at least 1.

8. A polymer consisting essentially of a structure having the formula

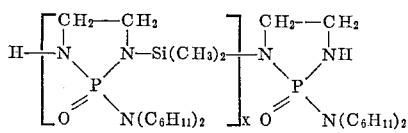

wherein $x$ is an integer of at least 1.

9. A polymer consisting essentially of a structure having the formula

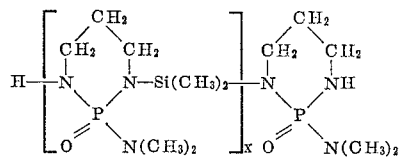

wherein $x$ is an integer of at least 1.

10. The process of preparing a polymeric composition comprising the steps of reacting
(a) a heterocyclic compound of the formula

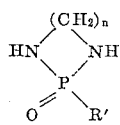

wherein
R' is a radical selected from the class consisting of N(R")$_2$, OR" and R";
R" is a hydrocarbon radical having no more than 20 carbon atoms selected from the class consisting of aliphatic, cycloaliphatic and aromatic hydrocarbon; and $n$ is an integer having a value of at least 2 and no more than 3;
(b) with a coupling reagent of the formula SiX$_4$ wherein
X is selected from the class consisting of halogen atoms and R" and OR", said reagent having at least two halogen atoms therein.

11. The process of claim 10 in which said coupling reagent is SiCl$_4$.

12. The process of claim 11 in which said heterocyclic compound is 2-diphenylamino-hexahydro-1,3,2-diazaphosphorine-2-oxide.

13. The process of claim 11 in which said heterocyclic compound is 2-diphenylamino-1,3,2-diazaphospholidine-2-oxide.

14. The process of claim 10 in which said coupling agent is dichlorodimethyl silane.

15. The process of claim 14 in which said heterocyclic compound is 2-diphenylamino-hexahydro-1,3,2-diazaphosphorine-2-oxide.

16. The process of claim 14 in which said heterocyclic compound is 2-diphenylamino-1,3,2-diazaphospholidine-2-oxide.

17. The process of claim 10 in which said coupling agent is methyl silane trichloride.

18. The process of claim 10 in which said coupling agent is dichlorodiethyl silane.

19. The process of claim 10 in which said coupling agent is ethyl silane trichloride.

References Cited by the Examiner

Autenrieth et al., "Berichte der Deutschen Chem. Gesellschaft," vol. 58, p. 2144–2150 (1925).

SAMUEL H. BLECH, *Primary Examiner.*